Patented Mar. 13, 1923.

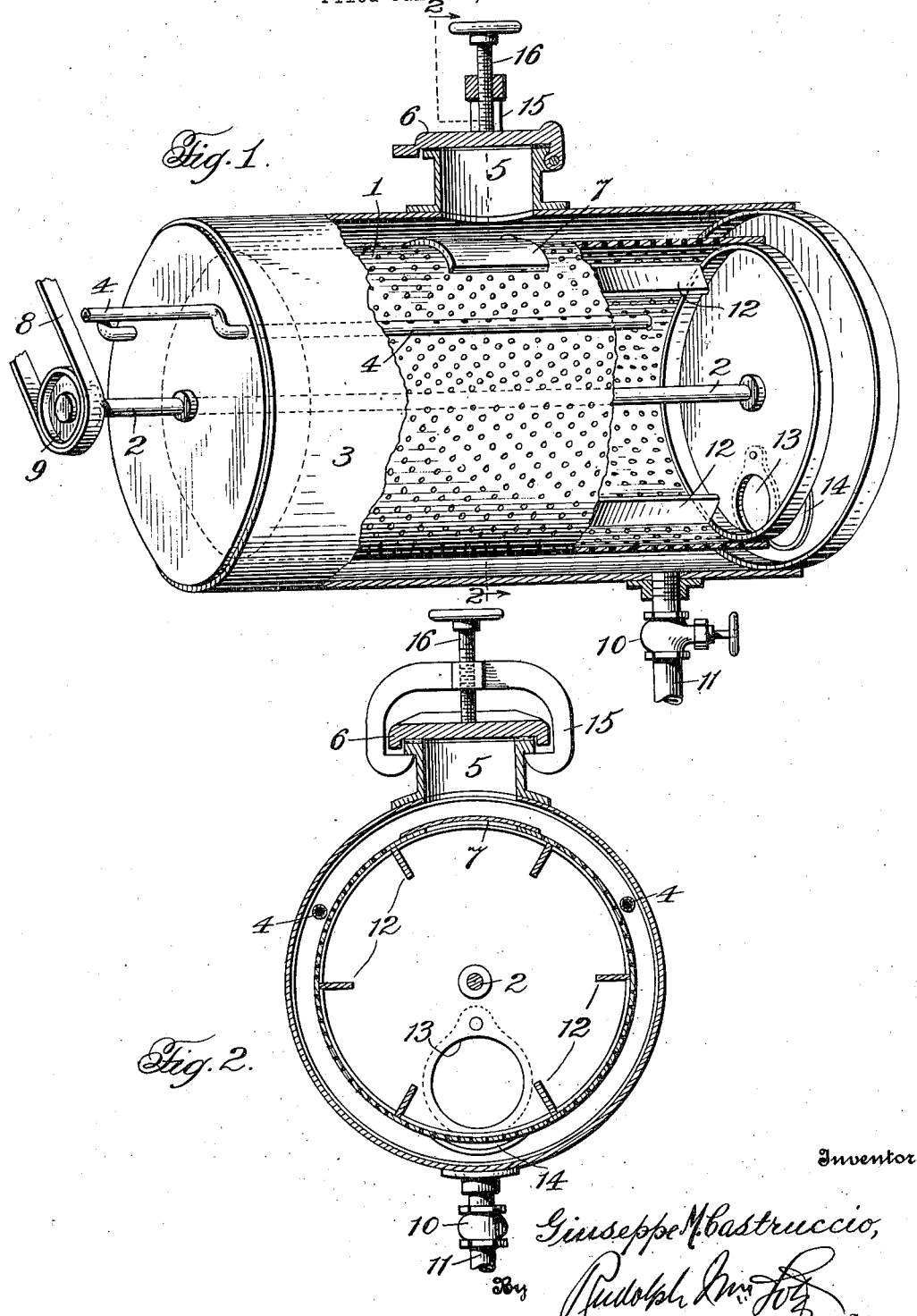

1,448,431

UNITED STATES PATENT OFFICE.

GIUSEPPE M. CASTRUCCIO, OF CHICAGO, ILLINOIS, ASSIGNOR TO THE UNITED FIG & DATE COMPANY, A CORPORATION OF ILLINOIS.

BLANCHED BRAZIL-NUT KERNEL.

Application filed January 18, 1923. Serial No. 613,526.

*To all whom it may concern:*

Be it known that I, GIUSEPPE M. CASTRUCCIO, a citizen of Italy, residing at Chicago, Illinois, have invented certain new and useful Improvements in Blanched Brazil-Nut Kernels; and I do hereby declare the following to be a full, clear, and exact description of the invention, such as will enable others skilled in the art to which it appertains to make and use the same.

My invention relates to edible nuts, its general aim being that of providing blanched sterilized Brazil nut kernels possessing their normal flavor, either detached from their shells or housed in shells so treated that the kernels can be readily extracted in completely or partially blanched condition by fracturing the shells.

Unlike most other edible nuts, the Brazil nuts do not permit the ready removal of the kernel from the shell in unfractured state. Instead, the raw nuts have their kernels adhesively joined to the shells and these shells have such physical characteristics that they cannot readily be fractured without also fracturing the kernels, this being due, probably to the fact that the kernels are so snugly housed by the shells that a collapsing pressure required to fracture the shells also fractures the kernels, the normal brittleness of the latter being also responsible for this in part. Even when the shell is fractured, fragments of the kernel are tightly attached to the shell fragments so that both the difficulty of cracking the tough shelled Brazil nuts and the effort required for picking the pieces of kernel out of and from the shell fragments make the Brazil nuts far less saleable than they should be in view of the normal palatability of their kernels.

In nut shelling practice, the difficulty of extracting the kernels has been partly overcome by subjecting the Brazil nuts to a preliminary treatment which facilitates the cracking of the nuts and which permits a considerable proportion of the kernels to be extracted in an uninjured condition. However, this practice, which involves a prolonged soaking of the unshelled nuts in hot water, partially cooks the kernels and decidedly changes their flavor, while not effecting a blanching of the kernels to any extent appreciably in excess of the usual yield derived from the shelling of the raw nuts, and while still leaving fragments of the shell so tightly attached to the kernels through the intervening membrane as to require hand labor for detaching the remaining portions of the kernel from the shell. Furthermore, the nuts when thus treated still require a skillful handling in order to crack any considerable portion of their shells without breaking or injuring the kernels, so that if uncracked, they still do not satisfy the demand for a Brazil nut which will have an easily fracturable shell and from which the kernel is completely detached so that by the mere cracking of the shell the kernel either drops out or is very easily extracted.

My present invention aims to meet the demands for furnishing kernels completely detached from the shells before cracking the latter, and fully or partially blanched and completely sterilized extracted Brazil nut kernels which have undergone no chemical change during treatment so that they retain the substantially normal flavor of the raw nut. To secure such new products, I desirably subject the Brazil nuts in the shell to a treatment which will loosen the kernel both from the surrounding membrane and from the shell, which will increase the brittleness of the shell, and which will increase the elasticity of the kernel without detachably altering the natural flavor and palatability of the kernel. These results can be obtained, for example, by carrying out the process set forth in full in my copending application Serial No. 613,384, treating Brazil nuts, as filed of even date herewith, in which desirable methods of procedure are more fully discussed and disclosed. Illustrative of the same, I may proceed as follows in employing a suitable apparatus for treating the nuts, as illustrated in the accompanying drawings, in which—

Fig. 1 is a perspective view of a nut treating apparatus, with portions thereof cut away to disclose the interior arrangement.

Fig. 2 is a transverse section taken through the filling inlet, or along the line 2—2 of Fig. 1.

The said apparatus comprises a horizontally disposed cylindrical drum 1 of a foraminous metal, mounted, to be rotated, upon a shaft 2 journaled in suitable fluid tight bearings in the end walls of a cylindrical casing 3. The latter is supplied with a plurality of perforated steam supply pipes 4 adapted to be suitably connected with a source of supply of steam under pressure and projecting into the free annular space between the drum 1 and the casing 3. The latter is provided with an opening 5 sealable by means of a suitable cover 6 adapted to be suitably locked down, through which nuts are adapted to be introduced into the drum 1, the latter having a gate 7 adapted to be aligned with the opening 5 when it is desired to introduce the nuts.

A pulley 9 on the shaft 2 adapted to be operatively connected with a power-actuated companion element by means of the belt 9, serves to rotate the drum.

Steam and water of condensation are adapted to be exhausted from the drum through the exhaust pipe 11 controlled by the valve 10. The drum is provided with cleats 12 for rapidly effecting a turning over of the batch of nuts to insure more uniform exposure of all thereof to the heat, and is provided with a suitable discharge gate 13 adapted to be aligned with a similar sealable opening 14 in the casing 3 through which the treated nuts are removed.

In using the above described apparatus, which is suitably equipped with a pressure gage and a thermometer, both omitted from illustration, the nuts are introduced into the drum 1 through the gate 7 and opening 5, the steam supply being shut off during the loading period. The gate 7 is then closed and the cover plate 6 clamped down. Then the drain or exhaust valve is closed, the drum 1 rotated and the valve controlling the steam supply is opened wide. In from three to six minutes, more or less, depending upon the temperature of the casing 3 and internal parts at the time the steam supply valve is opened, the temperature within the drum will be approximately 220 degrees Fahr. and, to maintain said temperature without appreciable variation, the operator manipulates the steam supply valve to alternately shut off and open the steam supply pipe more or less in accordance with variations in temperature indicated by the thermometer. This is continued for from about three to five minutes whereupon the steam supply valve is closed and the exhaust valve opened wide. The pressure then falls to zero within about thirty seconds, and, for a period of from three to five minutes, the drum is maintained in rotation. During this period the nuts apparently yield up a large part of the moisture absorbed during the initial stage of treatment while their temperature is more or less gradually reduced during this last period of tumbling.

The discharge gate 14 is then opened, the corresponding gate 13 in the drum brought into alignment therewith and also opened and the nuts withdrawn and dumped on the floor or into suitable receptacles. The gates 13 and 14 are then closed and the foregoing operations repeated.

The nuts, after withdrawal, yield up a heavy vapor for some time and are preferably exposed to atmosphere or room temperature for at least a day or two before they are cracked, dependent upon the method of cracking, as the shells gain in brittleness during that period, which is very desirable in machine cracking. In instances of hand cracking this exposure treatment may be partly or wholly eliminated.

A higher temperature with correspondingly higher pressure (the latter being purely incidental to temperature and playing no part in the success of the treatment, so far as I have been able to determine) may be used and the time of subjection of the nuts thereto correspondingly reduced. Higher temperatures are advantageous in effecting the yield of a larger percentage of blanched kernels but this advantage is offset by the danger of spoiling batches of nuts by cooking or scorching or decomposing them which is apt to occur by a few seconds over-exposure to the more intense heat.

The apparatus shown and described is purely exemplary of one adapted to the purpose and the above order of operation is specifically adapted to this particular apparatus, the procedure being more or less variable to suit the particular apparatus used.

In its broader concept the process consists, briefly, in subjecting the nuts in the shell to the action of heat of a degree adapted, within a period of approximately ten minutes or less, to cause the kernel to be heated to a point at which, apparently, moisture or a fluid exudes therefrom, which is demonstrated by the presence on the surface of the extracted kernel (while the latter is still very hot) of a film similar to light perspiration which seems to appear coincidentally with that physical change which renders the kernels of a rubber-like elasticity. The heating must be effected in the presence of a sufficient moisture content of the nut, either natural or artificially supplied, and preferably in the presence of moisture externally of the nut. The heat and moisture may conveniently be supplied jointly by employing steam at a temperature between approximately 220 degrees Fahr. as a minimum and, preferably, not exceeding 280 degrees Fahr. the duration of time being in inverse ratio to the temperature used and being limited and determined by the aforesaid film of moisture or the like on the kernel to determine the minimum of the said time interval and the change or impairment of the kernel, evidenced by a gelatinous translucency of the same in whole or in part, as the maximum of the time interval, the subjection of the nuts to the heat being required to be discontinued before this scorching or cooking occurs.

At a temperature approximating 220 degrees Fahr., the nuts are subjected to the action of the steam for about five minutes and to a condition tending to effect gradual reduction of said heat and the expulsion of moisture from the shells for a few minutes immediately following their subjection to the steam.

If the nuts are sufficiently moist containing not less than five percent of their weight in moisture, either naturally or artificially supplied (the exact minimum moisture content not having been determined) they may be treated in an ordinary dry oven in place of the steam chamber but the use of steam is preferable at all times. If it is proposed to employ the dry oven it is preferable to immerse the nuts in water until they have absorbed from three to five percent of their weight in water, luke warm water being preferred and the time of immersion being from about five minutes to an hour.

Exposure of the nuts to ordinary room temperatures for not less than about 24 hours after they are removed from the oven, is necessary before the shells have attained the degree of brittleness to render them most easily fracturable.

If, for example, the higher temperature of 280 degrees Fahr. is used, the duration of the time of subjection of the nuts to that temperature must be reduced to a maximum of about five minutes or less as the danger of scorching and cooking is far more imminent and the use of such high temperature, therefore, is far less practical although the result, from the standpoint of more thorough and uniform blanching of the kernels, is superior.

Consequently, my above described process when not followed by a shelling or cracking operation provides a Brazil nut kernel having highly desirable conditions imparted to the same and housed against dust and atmospheric effects by a shell to which highly desirable conditions have also been imparted. Whether the suitably treated kernel is thus housed by an also suitably treated shell or not, the kernel still possesses the unusual characteristics above mentioned, thus affording an article of commerce far superior to what has heretofore been offered on the market.

However, while I have here described a process whereby such super-conditioned kernels can be obtained in either shell-inclosed or unshelled form, I do not wish to be limited to any particular method of imparting the above recited novel characteristics to my novel product as here disclosed.

While a scattered few completely blanched Brazil nuts are found in every normal or natural batch, such blanched nuts have never been produced in commercial quantities so far as I am informed. The product of my invention as herein described, consists of approximately forty to fifty percent of completely blanched kernels and a further thirty to fifty percent of what I term "commercially blanched" kernels, the latter carrying the membrane only in one or a few spots. There are in each lot a negligibly small percentage of kernels that carry approximately fifty percent or more of the membrane and even these are so far superior to any product heretofore offered on the market that they bring a higher price.

I claim as my invention:—

1. A treated Brazil nut having an abnormally brittle easily fracturable shell and having its kernel completely detached from while housed in said shell and easily extractible from the shell fragments resulting from cracking the shell, said kernel being abnormally elastic for an indefinite period following treatment and thereby adapted to yield to pressure exerted on the shell to fracture the latter without effecting fracture of said kernel, the latter retaining substantially its normal flavor.

2. A treated Brazil nut having an abnormally elastic and substantially blanched kernel housed in the shell and detached from said shell and thereby easily extractible from fragments of said shell when the latter is fractured, said kernel retaining such elasticity for an indefinite period following treatment and possessing substantially the flavor of the raw nut.

3. A treated Brazil nut having an abnormally brittle easily fracturable shell and an abnormally elastic, normally flavored kernel detached from and easily extractible from shell fragments resulting from fracturing said shell and capable of yielding to cracking pressure imposed on the shell.

4. A treated Brazil nut having an abnormally brittle, easily fracturable shell and an abnormally elastic, normally flavored and substantially blanched kernel easily extractible from shell fragments resulting from fracturing said shell and adapted to yield, without breaking, to cracking pressure imposed on the shell.

5. A treated Brazil nut kernel liberated from its shell and substantially freed from its enclosing membrane, possessing abnormal elasticity and retaining substantially the flavor of the raw nut kernel.

Signed at Chicago, Illinois, January 17th, 1923.

GIUSEPPE M. CASTRUCCIO.